(12) United States Patent
Nobuhara et al.

(10) Patent No.: US 11,645,270 B2
(45) Date of Patent: May 9, 2023

(54) BLOCKCHAIN BACKUP AND RECOVERY

(71) Applicant: Coinbase Crypto Services, LLC, San Francisco, CA (US)

(72) Inventors: Bryan Nobuhara, Brooklyn, NY (US); Robert Christensen, Brooklyn, NY (US)

(73) Assignee: Coinbase, Inc., Oakland, CA (US)

( * ) Notice: Subject to any disclaimer, the term of this patent is extended or adjusted under 35 U.S.C. 154(b) by 228 days.

(21) Appl. No.: 17/079,861

(22) Filed: Oct. 26, 2020

(65) Prior Publication Data

US 2022/0131938 A1    Apr. 28, 2022

Related U.S. Application Data

(63) Continuation of application No. 17/078,530, filed on Oct. 23, 2020, now Pat. No. 11,194,791.

(51) Int. Cl.
*G06F 16/23* (2019.01)
*G06F 9/54* (2006.01)
(Continued)

(52) U.S. Cl.
CPC ............ *G06F 16/2379* (2019.01); *G06F 9/54* (2013.01); *G06F 16/9566* (2019.01);
(Continued)

(58) Field of Classification Search
CPC .................................................. G06F 16/2379
See application file for complete search history.

(56) References Cited

U.S. PATENT DOCUMENTS 11,194,791 B1    12/2021   Baine et al.

2011/0138034 A1    6/2011   Brookbanks et al.
(Continued)

OTHER PUBLICATIONS

Stoykov et al. "Vibes: fast blockchain simulations for large-scale peer-to-peer networks." Proceedings of the 18th ACM/IFIP/USENIX Middleware Conference: Posters and Demos. 2017. Dec. 11, 2017 (Dec. 11, 2017) Retrieved on Jan. 29, 2022 (Jan. 29, 2022) from <https://dl.acm.org/doi/abs/10.1145/3155016.3155020> entire document.
Feb. 24, 2022—(WO) International Search Report and Written Opinion—App PCT/US21/56221.

*Primary Examiner* — Van H Oberly
(74) *Attorney, Agent, or Firm* — Perkins Coie LLP

(57) ABSTRACT

In an embodiment, a method comprises performing a first synchronization operation for a blockchain node of a plurality of blockchain nodes of a blockchain network, the first synchronization operation comprising the blockchain node receiving blockchain history data from one or more blockchain nodes of the plurality of blockchain nodes of the blockchain network and storing the blockchain history data in one or more digital data repositories; determining that the blockchain history data satisfies one or more validation criteria; creating a new blockchain node of the blockchain network, the new blockchain node configured to retrieve the blockchain history data from the one or more digital data repositories and replicate the blockchain history data for the new blockchain node, the new blockchain node existing in an unsynchronized state; performing a second synchronization operation for the new blockchain node of the blockchain network, the second synchronization operation comprising the new blockchain node receiving blockchain update data from one or more blockchain nodes of the plurality of blockchain nodes of the blockchain network resulting in converting the new blockchain node to a synchronized state.

20 Claims, 9 Drawing Sheets

(51) Int. Cl.
  *H04L 67/10* (2022.01)
  *G06F 16/955* (2019.01)
  *H04L 9/32* (2006.01)
  *H04L 67/1095* (2022.01)
  *H04L 9/06* (2006.01)
  *G06Q 10/0631* (2023.01)
  *H04L 9/00* (2022.01)

(52) U.S. Cl.
  CPC .......... *H04L 9/0643* (2013.01); *H04L 9/3236* (2013.01); *H04L 67/10* (2013.01); *H04L 67/1095* (2013.01); *G06Q 10/06315* (2013.01); *H04L 9/50* (2022.05)

(56) References Cited

U.S. PATENT DOCUMENTS

| | | |
|---|---|---|
| 2017/0214699 A1 | 7/2017 | Johnsrud |
| 2019/0013933 A1 | 1/2019 | Mercuri et al. |
| 2019/0034459 A1 | 1/2019 | Qiu |
| 2019/0188046 A1 | 6/2019 | Florissi et al. |
| 2020/0067789 A1 | 2/2020 | Khuti et al. |
| 2020/0250656 A1* | 8/2020 | Hagimura ........... G06Q 20/3676 |
| 2020/0328888 A1* | 10/2020 | Treat ................... H04L 67/1095 |
| 2021/0141804 A1* | 5/2021 | Liu ........................ G06F 16/27 |

* cited by examiner

BLOCKCHAIN BACKUP AND RECOVERY

CROSS REFERENCE TO RELATED APPLICATION

This application claims the benefit under 35 U.S.C. § 120 as a continuation of application Ser. No. 17/078,530, filed Oct. 23, 2020, entitled "Blockchain Orchestrator Computer System", the entire contents of which are hereby incorporated by reference for all purposes as if fully set forth herein.

TECHNICAL FIELD

One technical field of the present disclosure relates to improved methods, systems, computer software, and/or computer hardware in the field of distributed transaction computer systems including blockchain networks and Proof-of-Stake consensus algorithms.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by their inclusion in this section.

Blockchain technology has been used in certain digital currency implementations. An example implementation and techniques are described in a 2008 article by Satoshi Nakamoto, titled "Bitcoin: A Peer-to-Peer Electronic Cash System". Other information about the structure, function and implementation of blockchain and distributed ledger software and computing systems is widely available in public sources.

FIG. 1 depicts an embodiment of a blockchain network, which comprises a plurality of blockchain nodes 104, 106, 108, 110, 112. Blockchain network 102 represents a computing environment for operating a decentralized framework that maintains a distributed data structure, which may be referred to herein as a secure distributed transaction ledger or a blockchain. The blockchain network 102 may support various functions, such as distributing computational tasks from one or more systems to one or more other systems, or interfacing and sharing data with other blockchain networks, among other functions.

Each blockchain node 104, 106, 108, 110, 112 comprises programmatic instructions that implement a set of procedures, the set of procedures herein referred to as a "blockchain protocol". Example blockchain protocols include the Bitcoin Protocol and the Ethereum Protocol. Each blockchain node 104, 106, 108, 110, 112 is configured to store a copy of a blockchain that is maintained by the blockchain network 102 and communicate with other blockchain nodes in the blockchain network 102. The execution of the programmatic instructions and storing of the blockchain may be facilitated by one or more computing devices or computing instances.

Generally, such a network would suffer from inherent uncertainty and distrust between the blockchain nodes when they transact because the blockchain nodes are typically unaffiliated with each other, may be transacting across vast distances, may be transacting anonymously, and because there is no centralized control or management to monitor or to resolve disputes. However, because the blockchain is maintained by each blockchain node 104, 106, 108, 110, 112 in the blockchain network 102 and because the blockchain is maintained according to set procedures that employ cryptographic methods and a consensus mechanism, the uncertain and distrust elements are mitigated.

Thus, the secure distributed transaction ledger, or blockchain, is a ledger maintained collectively by the blockchain nodes 104, 106, 108, 110, 112 in blockchain network 102. The blockchain includes blocks with digital data regarding recent transactions and/or messages, linking data that links one block to its previous block in the blockchain, consensus data that ensures that the state of the blockchain is valid, and is endorsed by the majority of the record keeping systems. Furthermore, all confirmed transactions are included in the blockchain and are done so using cryptography. This way, the integrity and the chronological order of the blockchain are enforced and can be independently verified by each blockchain node.

Digital data may be received by one or more blockchain nodes 104, 106, 108, 110, 112 in the blockchain network 102 for inclusion in the blockchain. This digital data is generally referred to as a "transaction" and is made available generally to the blockchain nodes 104, 106, 108, 110, 112 in the blockchain network 102. One or more computing devices, such as a computer, mobile phone, tablet, or server may be configured to connect to the blockchain network 102 to publish digital data to blocks of the blockchain.

When a transaction is initially received by a blockchain node, the blockchain node groups the transaction with other transactions into transaction entries of a proposed block. The proposed block is broadcasted to other blockchain nodes 104, 106, 108, 110, 112 of the blockchain network 102 according to a consensus algorithm. A consensus algorithm may be defined as the mechanism through which all participating blockchain nodes of a blockchain network interact with each other and reach consensus. For example, computing device 114 may generate a transaction and transmit the transaction to blockchain node 106. Blockchain node 106 generates a proposed block that includes the transaction and transmits the block to other blockchain nodes of the blockchain network 102. Blockchains are built as distributed systems and, since they do not rely on a central authority, the blockchain nodes need to agree on the validity of transactions. Consensus algorithms ensure that blockchain protocol rules are being followed and guarantee that all transactions occur in a trustless way. A consensus algorithm is defined as a mechanism through which all participating blockchain nodes of a blockchain network interact with each other to achieve agreement on a single data value among blockchain nodes of a blockchain network.

To support various blockchain protocols that include different types of consensus algorithms, different types of computing infrastructure are required. Setting up and running such pieces of infrastructure can be difficult and resource intensive. Uptime, reliability and security are of the utmost importance to blockchain protocols due to the way blockchain networks are able to ensure the integrity and immutability of the blockchain.

Based on the foregoing, it is desirable to provide techniques to quickly and efficiently deploy, manage and upgrade blockchain protocols.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
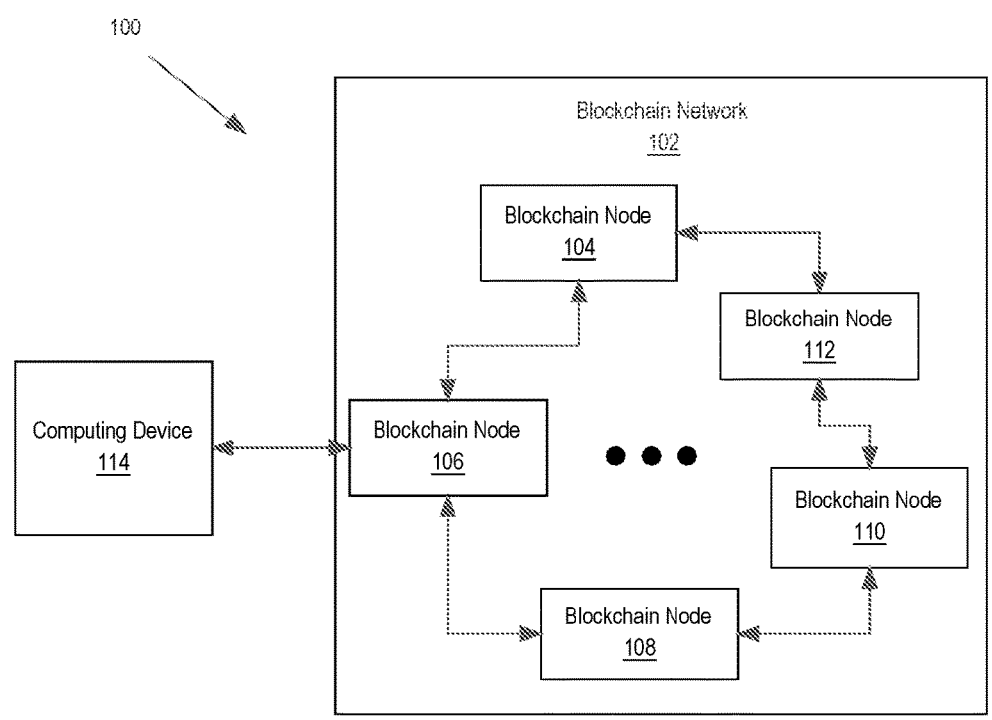
FIG. 1 illustrates an embodiment of a blockchain network.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention.

General Overview

A first aspect of the present disclosure relates to methods and systems for facilitating the deployment of geographically distributed blockchain infrastructure across various cloud infrastructure providers. In this aspect, an orchestrator computer system receives a request to deploy one or more blockchain nodes. Based on data included in the request, the orchestrator transforms the request into a first message that includes cluster configuration data that specifies application programming interface (API) information and authentication information for a target cluster of the deployment. The first message is supplemented with deployment configuration data to create a second message. Deployment configuration data specifies deployment information relating to chart templates that are used to facilitate the deployment to the target cluster. A chart template comprises a collection of files that describe a related set of resources that are specific to a blockchain protocol included in the request. Using the second message, a chart template specific to the blockchain protocol included in the request is modified by injecting values from the second message into the respective template. The modified template is then deployed to the target cluster by a container management system that implements one or more software components configured to apply chart templates to preconfigured clusters. In addition to a target cluster, one or more blockchain nodes can be applied across multiple regions spanning multiple clusters. Such blockchain infrastructure orchestration discussed above facilitates the expediate deployment of geographically distributed blockchain infrastructure across various cloud infrastructure providers. Using the above discussed techniques, blockchain nodes can be easily deployed to multiple geographic regions. Additionally, blockchain nodes can be easily and quickly moved from one geographic location to another and from one cloud infrastructure provider to another seamlessly.

A second aspect of the present disclosure relates to methods and systems for providing global blockchain synchronization. In this aspect, the deployment of multiple blockchain nodes that are specific to a blockchain protocol is facilitated by periodically downloading blockchain history data that comprises a history a blockchain of the blockchain protocol. Instead of performing an initial synchronization for every new blockchain node that is deployed to a blockchain network, a single initial synchronization operation can be performed by a single blockchain node and the blockchain history data received from the initial synchronization operation can be replicated for each new blockchain node. The replicated blockchain history data can be used as starting point for updating each new blockchain node with blockchain update data to synchronized state. In an orchestrator system when new blockchain nodes are frequently being created, these techniques save substantial amounts of computing resources and network bandwidth by avoiding performing an initial synchronization operation for each newly created blockchain node.

Periodically storing the blockchain history data retrieved from an initial synchronization operation is also be useful in the event of crash or failure of a synchronized blockchain node. If a synchronized blockchain node crashes, fails, or is corrupted, instead of performing an initial synchronization operation to recreate the synchronized state of the blockchain node, techniques discussed above such as using the blockchain history data as a starting point for synchronization of a blockchain node result in less downtown of a blockchain node than conventional systems.

A third aspect of the present disclosure relates to techniques to prevent double signing in a blockchain network. In this aspect, a protective interface is installed on a blockchain node that implements a Proof-of-Stake Consensus algorithm. The protective interface is configured to prevent a unique, block-signing entity from introducing an equivocation event such as double-spending on blockchain protocols. A first layer of the protective interface is a client-lock that protects a blockchain node from block-signing by refusing any attempts to run identity-holding software if a server cannot confirm the safe execution of block-signing code for a specific blockchain node. By utilizing a central entity (i.e. server) to keep track of which blockchain nodes are running and which software they are executing, the central entity can serve as a gatekeeper to running a blockchain node in a blockchain network. In an enterprise orchestrator environment where multiple blockchain nodes are being created and launched, this layer avoids launching the same blockchain node in two different locations, which can lead to double signing of a block and cause the respective blockchain node to be slashed. A second layer of the protective interface is a protocol aware protection interface that, for each blockchain node, refuses to permit a signing entity from receiving requests to sign a block in the event that a request has already been received to sign the same block. This layer ensures that only one block request is ever signed per block height.

Blockchain Orchestrator System

Figure 2:
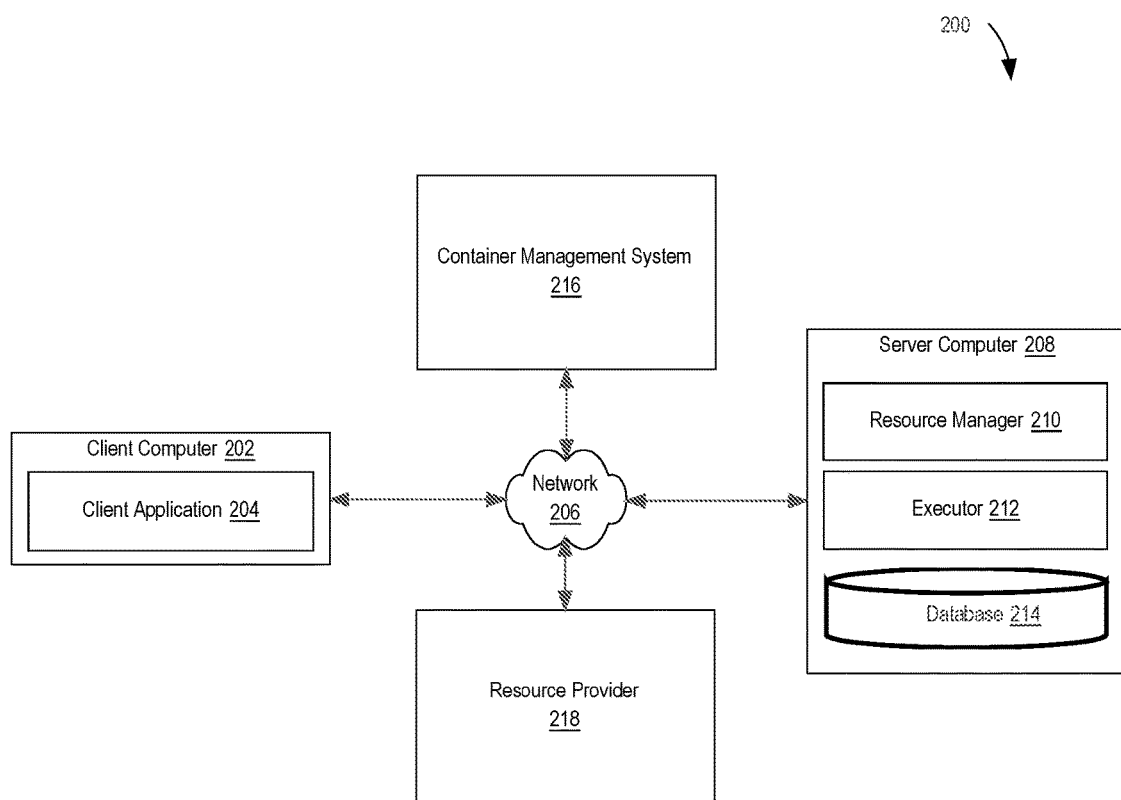
FIG. 2 illustrates an example networked computer system with which various implementations may be practiced.

FIG. 2 illustrates an example networked computer system with which various implementations may be practiced. FIG. 2, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of how to obfuscate queries and responses to queries. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

FIG. 2 is shown in simplified, schematic format for purposes of illustrating a clear example and other implementations may include more, fewer, or different elements. System 200 comprises various entities and devices which may be used to practice an implementation. Network 206 is a network entity which facilitates communication between entities depicted in FIG. 2. Connection to network 206 is shown by double-sided arrows between a connecting entity and network 206. Network 206 may be any electronic communication medium or hub which facilitates communications between two or more entities, including but not limited to an internet, an intranet, a local area connection, a cloud-based connection, a wireless connection, a radio connection, a physical electronic bus, or any other medium over which digital and electronic information may be sent and received.

Client computer 202 is a device/entity which allows a client to generate requests and queries, transmit requests and queries to server computer 208, and receive responses to requests and queries from server computer 208. Client computer 202 may be any device, such as a mobile computing device, capable of connection to network 206 through any method described herein. Client computer 202 may comprise various programs, modules, or software applications that may be used to generate requests, receive responses to requests, and execute programmatic functions in response to requests. In various implementations, client computer 202 implements and executes client application 204, the functions of which are described herein. Client computer 202 may receive actions comprising instructions, requests, notifications, and/or recommendations to execute or display from server computer 208.

Client application 204 comprises computer executable instructions that may be programmed or configured to generate requests to deploy one or more blockchain nodes. For example, client application 204 may be programmed or configured to generate a request comprising one or more cloud infrastructure providers, a blockchain protocol, a name, one or more regions, and a network.

Server computer 208 is connected to network 206 and is an entity which facilitates the orchestration of blockchain protocols and/or blockchain networks. Server computer 208 may be any hardware, software, virtual machine, or general-purpose entity capable of performing the processes discussed herein. In various implementations, the server computer 208 executes resource manager 210 and executor 212, the functions of which are described in other sections herein. The server computer 208 may also execute additional code, such as code for receiving requests from client computer 202, generating and transmitting requests and queries to database 214, and generating and transmitting requests to container management system 216 and resource provider 218.

Resource manager 210 comprises computer executable instructions that may be programmed or configured to generate messages based on request parameters and cluster configuration data that is based on request parameters. For example, resource manager 210 may be programmed or configured to receive a request to deploy one or more blockchain nodes. Resource manager 210 may use a mapping stored in database 214 to identify one or more subsets of cluster configuration data that are mapped to one or more parameters included in the request. Resource manager 210 may combine the one or more subsets of cluster configuration data to generate a first message. Resource manager 210 may then transmit the first message to executor 212.

Executor 212 comprises computer executable instructions that may be programmed or configured to receive a first message from resource manager 210 and generate a new message based on the first message and deployment configuration data. Executer 212 may also be configured to facilitate the deployment of a blockchain protocol to container management system 216. For example, executor 212 may be programmed or configured to create and/or manage jobs (e.g., synthetic tests, builds, deployments, etc.). Executor 212 communicates with container management system 216 to provision one or more containers and clusters for executing the jobs on the provisioned infrastructure.

Computer executable instructions described herein may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 2 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the server computer 208.

Database 214 may be any number of individual or linked storage devices or mediums which allow the storage of digital data, as discussed herein. Database 214 may further include one or more database management systems (DBMS) for accessing, retrieving, storing, and/or manipulating data stored in database 214. The DBMS may use any of a variety of database models (e.g., relational model, object model, etc.) and may support any of a variety of query languages. In one embodiment, database 214 stores cluster configuration data. In one embodiment, cluster configuration data includes application programming interface (API) information for a target cluster of a deployment and authentication information for the target cluster. In another embodiment, cluster configuration data includes a blockchain protocol identifier, a version of the blockchain protocol, an operation type, a unique identifier, configuration parameters for all cluster regions, configuration parameters for a target cluster, and configuration parameters for the blockchain protocol.

In another embodiment database 214 stores a mapping that maps request parameters to a subset of cluster configuration data.

In another embodiment database 214 stores deployment configuration data. In one embodiment, deployment configuration data includes digital data used to deploy the one or more blockchain nodes specified in the request to a target cluster. In another embodiment, deployment configuration data includes cluster path data that specifies a path to cluster configuration data, a chart repository URL and backend data that specifies a storage type, a storage region, bucket type and prefix.

In another embodiment database 214 stores a plurality of chart templates. In one embodiment, a chart template comprises a collection of files that describe a related set of resources that are specific to the blockchain protocol. For example, one chart template may be specific to the Ethereum protocol while another chart template may be specific to the Bitcoin protocol. Chart templates are further discussed herein.

Resource provider 218 is connected to network 206 and is an entity which provides infrastructure (i.e., the compute resources) required to execute scheduled jobs, applications, and/or blockchain nodes. The infrastructure may be provided via one or more on-premises data centers or one or more remote data centers hosted by a cloud infrastructure provider such as Amazon Web Services. Further, the resource provider 218 may assign infrastructure in the form of physical machines or virtual machines. In any case, executor 212 may communicate with the resource provider 218 and request the resource provider to assign certain resources (e.g., CPU and memory) to the executor 212. The resource provider 218 in turn may then determine the number of physical and/or virtual machines that would be required to fulfil the desired CPU and memory requirements and assign these physical or virtual machines to the executor 212. The collection of compute resources assigned to the executor 212 at any given time is called a compute group.

The resource provider 218 is also configured to increase or decrease the compute resources assigned in a compute group. In certain cases, resource provider 218 may be configured to automatically scale the compute resources in the compute group based on monitored demand. In other cases, resource provider 218 may be configured to scale-up or scale-down the assigned number of assigned physical/virtual machines based on external instructions.

Container management system 216 is connected to network 206 and is an entity which facilitates the deployment, scaling, and management of containerized applications. is configured to automate the assignment and management of scheduled jobs, applications, and blockchain nodes. Container management system 216 is configured to assign jobs to the physical/virtual machines provided by the resource provider 218. To this end, container management system 216 determines the virtual/physical machines assigned to executor 212 and automatically assigns a scheduled job, application, and/or blockchain node from executor 212 to a virtual/physical machine assigned to executor 212 or compute group. In addition, the container management system 216 is configured to manage job deployments and scale the underlying compute group based on demand. Examples of container management systems include DOCKER, Amazon Web Services EC2 Container Services, and Google Kubernetes. Container management system 216 may be any hardware, software, virtual machine, or general-purpose entity capable of performing the processes discussed herein.

In container-based virtualization, the container management system 216 is configured to create containers and launch such containers on the physical/virtual machines in a compute group. Typically, the container management system 216 launches containers on the underlying machines in a manner that distributes the load evenly among the active machines. The container management system 216 is also configured to receive chart templates from the executor 212 and deploy such charts templates in existing containers.

Container Management System

Some of the implementation details of the container management system 216 from FIG. 2 will be described with respect to a Kubernetes orchestration system, referred to herein at "Kubernetes". It will be appreciated that Kubernetes is merely used as an example to illustrate the methods described herein are not limited to operating with Kubernetes but can operate with other container management systems as well.

Figure 3:
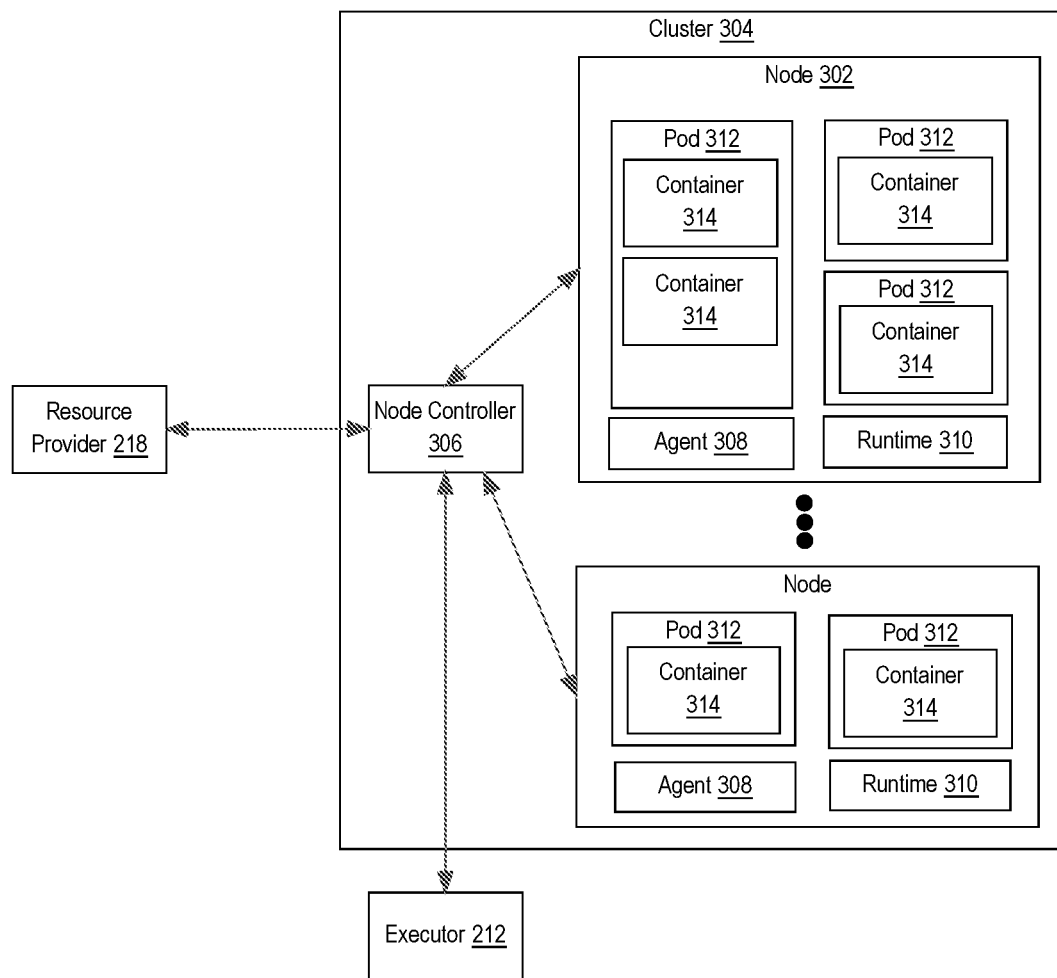
FIG. 3 illustrates an example container management system.

FIG. 3 illustrates a container management system 300, such as container management system 216 from FIG. 2. In Kubernetes, an underlying compute resource (i.e., a physical or virtual machine) is called a node 302. A group of such worker machines that are all assigned to the same compute group is called a cluster 304. In some embodiments, a cluster comprises a single worker machine. As referred to herein, a cluster is an abstracted version of a compute group. In some embodiments, different executors 212 may be assigned to different clusters. Each node 302 in a particular cluster 304 correlates with a corresponding compute resource assigned to the executor 212 by the resource provider 218 and in this disclosure the terms node and compute resource may be interchangeably used. Further, each node 302 in the cluster 304 contains the services necessary to run containers and is managed by a common node controller 306.

The node controller 306 typically manages a list of the nodes 302 in the cluster 304 and synchronizes this list with the resource provider's list of machines assigned to that particular executor 212. The node controller 306 may also be configured to communicate with the resource provider 218 from time to time to determine if an underlying machine is still available or not. If an underlying machine is not available, the node controller 306 is configured to delete the corresponding node 302 from its list of nodes. In this manner, the node controller 306 is always aware of the infrastructure assigned to the cluster by the resource provider 218.

Each node includes an agent 308 that is configured to ensure that containers are running within the node and a runtime 310 that is responsible for running the containers. With the help of the agent 308 and runtime 310, one or more pods 312 may be launched on the active nodes 302 in a cluster 304. A pod 312 is the basic building block of Kubernetes. A pod 312 encapsulates one or more containers 314, storage resources (not shown), and options that govern how the containers 314 should run.

Typically, the node controller 306 can query the agent 308 running on each node 302 in the cluster 304 to retrieve information about the nodes including the available resources on the node: the CPU, memory, and the maximum number of pods 312 that can be scheduled onto the node 302 at any given time. Further, the agent 308 can inform the controller 306 of all active pods on the node and the job requests scheduled for execution on the pods 312.

The node controller 306 can receive requests to deploy an application or one or more blockchain nodes in the cluster 304. Such requests may include one or more deployment files, such as a chart or chart template, which are used to deploy an application or one or more blockchain nodes in a cluster 304.

Chart Templates

A packaging format referred herein as a 'chart' can be used to deploy a workload such as a blockchain node to a cluster. A chart is a collection of files that describe a related set of resources. In one example, a single chart might be used to deploy a blockchain node or components of a blockchain node in a cluster.

In some embodiments, a chart is organized as a collection of files inside of a directory. Charts comprise one or more YAML files that accept variables. The collection of files of a chart generally includes a values.YAML file, template files that consume the values from the values file, a chart.YAML file with name and version information, and a NOTES.txt file which prints on the command line when you start your application. Technical details and examples of charts are taught in the related reference "Charts," at https://helm.sh/docs/topics/charts/.

Charts can be deployed to Kubernetes clusters in a variety of ways. In one embodiment, a command line interface (CLI) binary called 'Helm' allows a user to perform communication with a remote software component, called 'Tiller' that is installed inside a target cluster. Tiller is the in-cluster component of Helm. It interacts directly with the cluster APIs (i.e. Kubernetes API server) to install, upgrade, query, and remove cluster resources. Tiller is also the software component that is responsible for deploying charts to the target cluster. Technical details and examples of Helm and Tiller are taught in the related reference "Helm" at https://helm.sh/.

In another embodiment, an infrastructure as code tool can be used to deploy charts to clusters Infrastructure as code allows developers to describe the desired "end-state" cloud or on-premises infrastructure for running a workload. The tool then generates a plan for reaching that end-state and executes the plan to provision the infrastructure. In one embodiment, an infrastructure as code tool comprises Terraform by HashiCorp. Terraform can be used to deploy charts to clusters. Technical details and examples of Terraform are taught in the related reference "Terraform" at https://www.terraform.io/

When deploying a blockchain node to a cluster, charts, also referred to herein as 'chart templates', can be used to model different blockchain protocols as a means for facilitating quick and efficient deployment of a blockchain node to a cluster. Using techniques discussed herein, a chart template can be pre-configured and stored for each different blockchain protocol. Various configuration parameters can be injected into the pre-configured chart templates. The modified chart templates can then be deployed to target clusters.

Blockchain Orchestrator Example

Figure 5:
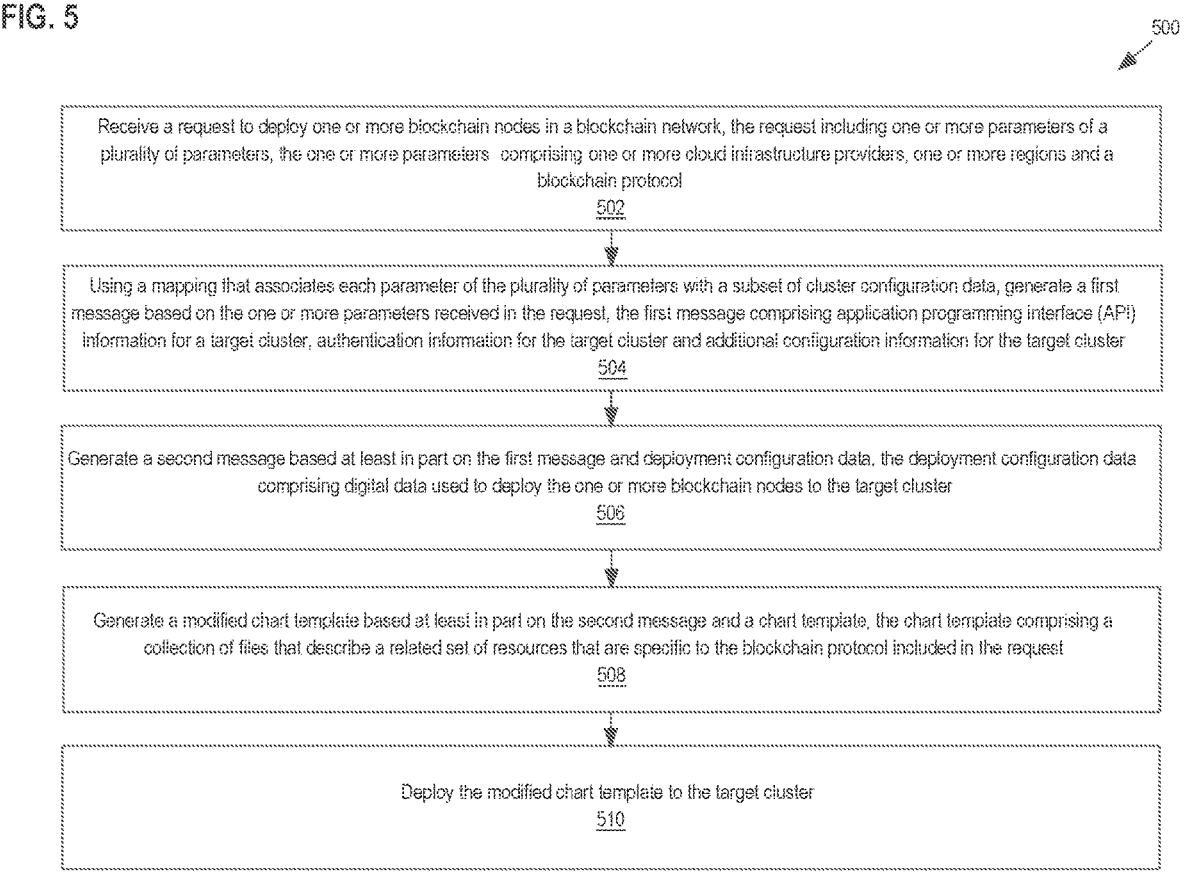
FIG. 5 depicts a method for deployment of geographically distributed blockchain infrastructure across various cloud infrastructure providers.

FIG. 5 depicts a method for deployment of geographically distributed blockchain infrastructure across various cloud infrastructure providers, in an example embodiment. FIG. 5 is described at the same level of detail that is ordinarily used, by persons of skill in the art to which this disclosure pertains, to communicate among themselves about algorithms, plans, or specifications for other programs in the same technical field. While the algorithm or method of FIG. 5 shows a plurality of steps, the algorithm or method described herein may be performed using any combination of one or more steps of FIG. 5 in any order, unless otherwise specified.

For purposes of illustrating a clear example, FIG. 5 is described herein in the context of FIG. 2 and FIG. 3, but the broad principles of FIG. 5 can be applied to other systems having configurations other than as shown in FIG. 2 and FIG. 3. Further, FIG. 5 and each other flow diagram herein illustrates an algorithm or plan that may be used as a basis for programming one or more of the functional modules of FIG. 2 and FIG. 3 that relate to the functions that are illustrated in the diagram, using a programming development environment or programming language that is deemed suitable for the task. Thus, FIG. 5 and each other flow diagram herein are intended as an illustration at the functional level at which skilled persons, in the art to which this disclosure pertains, communicate with one another to describe and implement algorithms using programming. The flow diagrams are not intended to illustrate every instruction, method object or sub step that would be needed to program every aspect of a working program, but are provided at the high, functional level of illustration that is normally used at the high level of skill in this art to communicate the basis of developing working programs.

At step 502, a request to deploy one or more blockchain nodes in a blockchain network is received. The request includes one or more parameters of a plurality of parameters. The one or more parameters comprise one or more cloud infrastructure providers, one or more regions and a blockchain protocol. In some embodiments, the one or more parameters also include a name, and a network. For example, client application 204 operating on client computer 202 generates a request to generate one or more blockchain nodes. Client computer 202 transmits the request to server computer 208 where the request is handled by resource manager 210.

At step 504, using a mapping that associates each parameter of the plurality of parameters with a subset of cluster configuration data, a first message is generated based on the one or more parameters received in the request. Cluster configuration data comprises programming interface (API) information for a plurality of clusters, authentication information for the plurality of clusters and additional configuration data for the plurality of clusters. Each subset of cluster configuration data that is mapped one or more parameters included in the request is combined to generate the first message. For example, the cloud infrastructure providers and the one or more regions specified in the request map to preconfigured clusters that are located in the respective regions. Thus, when the first message is generated, the first message includes the subsets of the cluster configuration data that is specific to the parameters included in the request. For example, resource manager 210 uses the mapping stored in database 214 to identify one or more subsets of cluster configuration data that are mapped to the one or more parameters included in the request. Resource manager 210 combines the one or more subsets of cluster configuration data to generate the first message.

An example of the first message is shown below in TABLE 1:

TABLE 1

First Message Example

Protocol type, identifies workflow to be run by executor
type: "bitcoinsv"
Protocol version, identifies workflow version to be run by executor
version: "0.0.13"
Operation type (Create, Update, Delete)
operation: "Create"

TABLE 1-continued

First Message Example

```
# Unique identifier used to track operation
uuid: "834ac28d-af2a-4226-b760-9878644f3836"
# Configuration parameters
parameters:
    # Internal customer identifier
    customer:
        uuid: "6f645634cf-5de8-4415-9ccc-6e44562345e8"
        name: ""
    # Parameters for resource creation
    resource:
        # Internal resource identifier
        uuid: "45a4678d-0638-4d7e-b4e2-9967847889b"
        # Customer identifier
        name: "bitcoin-test"
        # Configuration parameters that apply to all cluster regions
        global:
            dsp:
                url: "https://dev.test.net/v1"
        # Configuration of clusters that this resource will reside in.
        # For single region deployments there will be a single "primary" entry,
        # multiregion deployments will additionally carry a "secondary" entry.
        clusters:
            primary:
                # Name used to identify cluster
                name: "AWS: US East (Ohio)"
                # Domain to access kubernetes api
                domain: "data.us-east.aws.test.net"
                # Cloud provider that cluster is located
                provider: "aws"
                # Cloud region that cluster is located
                region: "us-east"
                # For multiregion deployments backup region is used to determine where secondary will be deployed
                backupRegion: "us-east1.gcp"
                # Identifiers used to route requests to internal vault
                vaultPath: "kubernetes-aws-us-east-2-data"
                vaultAddr: "https://vault.control.us-east.aws.test.net:8200"
                # External DNS address used when assigning DNS names to resources
                externalDNS: "test.net"
                # Repository containing docker images
                dockerRepository: "docker.io"
                # SSL Certificate issuer
                issuer: "encrypt"
                # Cloud bucket containing blockchain data backups
                gbsBucket: "s3://bitcoin-dev"
            secondary:
                name: "GCP: South Carolina"
                domain: "data-us-east-test"
                provider: "gcp"
                region: "us-east"
                backupRegion: "us-east.aws"
                vaultPath: "kubernetes-gcp-us-east-data"
                vaultAddr: "https://vault.gcp.test.net"
                externalDNS: "dev.gcp.test.net"
                dockerRepository: "docker.io"
                issuer: "letsencrypt-staging"
                gbsBucket: "gs://bitcoin-dev"
                snapshot:
                    bucket: ""
                    region: ""
    # Parameters used to configure protocol network:
        # Cluster type qt (query and transaction) or participation
        clusterType: "qt"
        # Customer identifier
        name: "bitcoin-test"
        network: "mainnet"
        region: "us-east.aws"
        # Number of replicas
        replicaCount: 1
    # Key value pairs (secretName: vaultPath)
    secrets: { }
```

Table 1 shows an example first message that includes application programming interface (API) information for a target cluster, authentication information for the target cluster and additional configuration data for the target cluster and secondary/backup cluster. Specifically, Table 1 shows a blockchain protocol type, a version of the blockchain protocol, an operation type, a unique identifier, configuration parameters for all cluster regions, configuration parameters for a target cluster, configuration parameters for a backup or secondary cluster and configuration parameters for the blockchain protocol.

At step 506, a second message is generated based at least in part on the first message and deployment configuration data. The deployment configuration data comprises digital data used to deploy the one or more blockchain nodes to the target cluster. For example, resource manager 210 transmits the first message to executor 212. Executor 212 receives the first message and supplements the first message with deployment configuration data. Deployment configuration data may be preconfigured or specific to one or more parameters included in the request or first message.

An example of the second message is shown below in TABLE 2:

TABLE 2

Second Message Example

```
# Protocol type, identifies workflow to be run by executor
type: "bitcoinsv"
Protocol version, identifies workflow version to be run by executor
version: "0.0.13"
Operation type (Create, Update, Delete)
operation: "Create"
# Unique identifier used to track operation
uuid: "834ac28d-af2a-4226-b760-9878644f3836"
# Configuration parameters
parameters:
  # Internal customer identifier
  customer:
    uuid: "6f645634cf-5de8-4415-9ccc-6e44562345e8"
    name: ""
  # Parameters for resource creation
  resource:
    # Internal resource identifier
    uuid: "45a4678d-0638-4d7e-b4e2-9967847889b"
    # Customer identifier
    name: "bitcoin-test"
    # Configuration parameters that apply to all cluster regions
    global:
      dsp:
        url: "https://dev.test.net/v1"
    # Configuration of clusters that this resource will reside in.
    # For single region deployments there will be a single "primary" entry,
    # multiregion deployments will additionally carry a "secondary" entry.
    clusters:
      primary:
        # Name used to identify cluster
        name: "AWS: US East (Ohio)"
        # Domain to access kubernetes api
        domain: "data.us-east.aws.test.net"
        # Cloud provider that cluster is located
        provider: "aws"
        # Cloud region that cluster is located
        region: "us-east"
        # For multiregion deployments backup region is used to determine where secondary will be deployed
        backupRegion: "us-east1.gcp"
        # Identifiers used to route requests to internal vault
        vaultPath: "kubernetes-aws-us-east-2-data"
        vaultAddr: "https://vault.control.us-east.aws.test.net:8200"
        # External DNS address used when assigning DNS names to resources
        externalDNS: "test.net"
        # Repository containing docker images
        dockerRepository: "docker.io"
        # SSL Certificate issuer
        issuer: "encrypt"
        # Cloud bucket containing blockchain data backups
        gbsBucket: "s3://bitcoin-dev"
      secondary:
        name: "GCP: South Carolina"
        domain: "data-us-east-test"
        provider: "gcp"
        region: "us-east"
        backupRegion: "us-east.aws"
        vaultPath: "kubernetes-gcp-us-east-data"
        vaultAddr: "https://vault.gcp.test.net"
        externalDNS: "dev.gcp.test.net"
        dockerRepository: "docker.io"
```

TABLE 2-continued

Second Message Example

```
            issuer: "letsencrypt-staging"
            gbsBucket: "gs://bitcoin-dev"
            snapshot:
                bucket: ""
                region: ""
    # Parameters used to configure protocol network:
        # Cluster type qt (query and transaction) or participation
        clusterType: "qt"
        # Customer identifier
        name: "bitcoin-test"
        network: "mainnet"
        region: "us-east.aws"
        # Number of replicas
        replicaCount: 1
    # Key value pairs (secretName: vaultPath)
    secrets: { }
#deployment configuration data
TerraformConfig:
            KubeConfigPath: "/kubeconfigs"
            HelmRepositoryURL: "https://chartmuseum.stagebison.net"
            Backend:
                Type: "s3"
                Region: "us-east-2"
                Bucket: "executor-tf"
                Prefix: "workflows"
```

Table 2 shows an example second message that includes all of the content of the first message supplemented with deployment configuration data. As discussed above, deployment configuration data includes digital data used to deploy the one or more blockchain nodes specified in the request to a target cluster. The deployment configuration data section begins with the section of Table 2 annotated as "#deployment configuration data". As shown, deployment configuration data includes cluster path data that specifies a path to cluster configuration data, a chart repository URL for accessing chart templates and backend data that specifies a storage type, a storage region, bucket type and prefix.

At step 508, a modified chart template is generated based at least in part on the second message and a chart template. The chart template comprises a collection of files that describe a related set of resources that are specific to the blockchain protocol included in the request. For example, database 214 stores a plurality of chart templates for a plurality of blockchain protocols. Executor 212 identifies a chart template that is associated with the blockchain protocol specified in the request or second message. Executor 212 generates the modified chart template by injecting one or more values or parameters included in the second message into the chart template. In on embodiment, executor 212 injects the one or more values or parameters included in the second message into a values YAML file of the chart template. The modified chart template includes one or more values files that are specific to the blockchain protocol that is included in the request or second message.

At step 510, the modified chart template is deployed to the target cluster. For example, executor 212 transmits the modified chart template to container management system 216. Container management system 216 is configured to deploy one or more blockchain nodes based on the modified chart template. In some embodiments, the target cluster comprises a Kubernetes cluster. In one embodiment, as the modified chart template is deployed, the one or more values files included in the modified chart template are consumed by one or more other files of the modified chart template. The modified chart template is then deployed to the target cluster.

In some embodiments, if the initial request specified in step 502 includes multiple regions, the one or more blockchain nodes specified in the request may be deployed in multiple clusters across the multiple regions. In this scenario, in addition to the target cluster, cluster configuration data for a secondary cluster is included in the first message based on the mapping and passed to the second message, as shown in Table 1 and Table 2. Additionally, deployment configuration data for the secondary cluster may be appended to the second message in addition to deployment configuration data for the target cluster. The secondary cluster may be associated with a different cloud infrastructure provider and region than the target cluster, as specified in the request, and also may be associated with a different backend.

In some embodiments, a cluster such as the target cluster or secondary cluster, is configured to execute one or more application or services that facilitate the execution of the one or more blockchain nodes. For example, a cluster may be configured to execute a metric alerting system to monitor blockchain nodes deployed in the cluster and generate metrics related to the performance of the blockchain node in the cluster. A cluster may be configured to execute a log aggregation service that centralized all log that are recorded during the execution of a blockchain node by a cluster. The log aggregation service pipes all logs to a central repository so that anomaly detection, alerting and analysis can be performed. A cluster may be configured to execute a certificate management service that provides certificates to clusters on demand.

Techniques discussed above facilitate the expediate deployment of geographically distributed blockchain infrastructure across various cloud infrastructure providers. Using the above discussed techniques, workloads such as blockchain nodes can be easily deployed to multiple geographic regions. Additionally, blockchain nodes can be easily and quickly moved from one geographic location to another and one cloud infrastructure provider to another seamlessly.

Global Blockchain Synchronization

When a new blockchain node of a blockchain network is created or deployed, a blockchain protocol is deployed via the blockchain node. Deploying a blockchain protocol on a blockchain node of a blockchain network includes synchronizing the new blockchain node with one or more other blockchain nodes of the blockchain network. Synchronizing the new blockchain node with one or more other blockchain nodes of the blockchain network includes performing an initial synchronization operation by downloading blockchain history data comprising all blocks of a blockchain that is maintained by the one or more blockchain nodes of blockchain network.

As an example, assume blockchain node 104 is a newly deployed blockchain node to blockchain network 102 in FIG. 1. When blockchain node 104 is deployed, blockchain node 104 performs an initial synchronization operation. The initial synchronization operation may include blockchain node 104 sending multiple requests to one or more other blockchain nodes of the blockchain network 102 for each block of a blockchain that is maintained by the blockchain network 102. For example, blockchain node 104 may issue a request for data relating to a first block of the blockchain from blockchain node 106. Once the first block is received, blockchain node 104 may then request for data relating to a second block of the blockchain from blockchain node 112, and so on until every block up to the latest block is received by blockchain node 104.

It is important to note that when the initial synchronization operation is being performed, multiple blockchain nodes of blockchain network 102 participate in sending data relating to blocks of the blockchain to the new blockchain node 104 to help maintain the integrity and immutability of the blockchain. The initial synchronization is performed until the newly deployed blockchain node has downloaded or received the blockchain history data comprising all blocks that currently exist in the blockchain. When the newly deployed blockchain node has downloaded or received the blockchain history data comprising all blocks that currently exist in the blockchain, the newly deployed blockchain node is in a synchronized state with respect to the blockchain network.

While an initial synchronization operation is effective in ensuring the integrity and immutability of a blockchain while deploying a new blockchain node to a blockchain network, an initial synchronization operation often requires substantial overhead and computing resources to complete. For example, for common blockchain protocols such as the Bitcoin Protocol and the Ethereum Protocol, the blockchains facilitated by each respective protocol are well over 200 gigabytes in size and growing with each new block that is added. Additionally, each blockchain node participating in the initial synchronization operation may be located anywhere in the world with variable speeds and processing power. Thus, performing an initial synchronization operation that requires receiving each block of blockchain history data from multiple blockchain nodes of various geographic locations and compute resources is a time and resource intensive operation, often requiring multiple days to complete.

To overcome the pitfalls of synchronizing new blockchain nodes with a blockchain network, blockchain nodes can be deployed periodically (i.e. once per day, once per week) to perform the initial synchronization operation. Once the entire blockchain history is received by a blockchain node, the blockchain history is stored in one or more digital data repositories. Once the blockchain history data is stored, validation and monitoring checks can be performed on the blockchain history data. When a new blockchain node is deployed, the blockchain history data that is stored in one or more digital data repositories can be replicated for the new blockchain node. Since new blocks are constantly being added to blockchain networks, when a new blockchain node is deployed based on the replicated blockchain history data, the new blockchain node will be in an unsynchronized state and will need to be updated to be converted into a synchronized state. The new blockchain node can perform a second synchronization operation that receives blockchain update data comprising one or more blocks from one or more blockchain nodes of the blockchain network, resulting in converting the new blockchain node from an unsynchronized state to a synchronized state. Additional new blockchain nodes can be deployed using the above discussed techniques to avoid performing an initial synchronization operations every time a new blockchain node is launched.

Thus, instead of performing an initial synchronization for every new blockchain node of a blockchain network, a single initial synchronization operation can be performed, and the blockchain history data received from the initial synchronization operation can be replicated for multiple new blockchain node. The replicated blockchain history data can be used as starting point for updating each new blockchain node with blockchain update data to synchronized state.

Global Blockchain Synchronization Example

Figure 6:
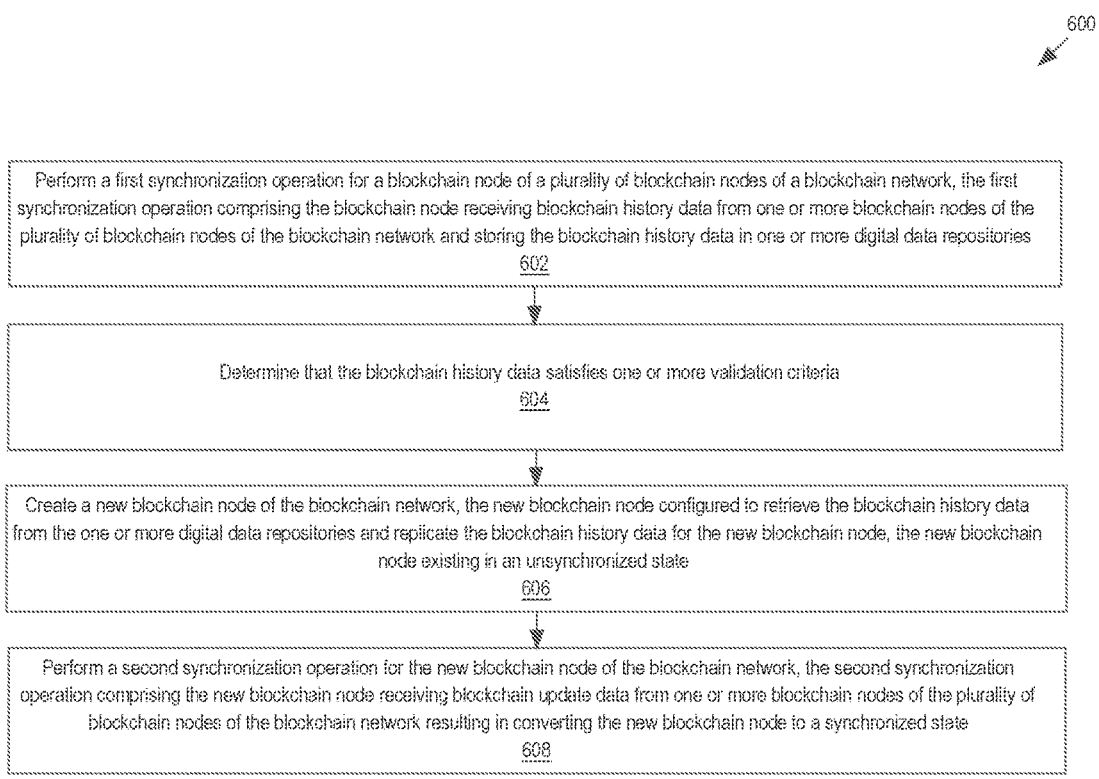
FIG. 6 depicts a method for providing global blockchain synchronization.

FIG. 6 depicts a method for providing global blockchain synchronization, in an example embodiment. FIG. 6 is described at the same level of detail that is ordinarily used, by persons of skill in the art to which this disclosure pertains, to communicate among themselves about algorithms, plans, or specifications for other programs in the same technical field. While the algorithm or method of FIG. 6 shows a plurality of steps, the algorithm or method described herein may be performed using programming. The flow diagrams are not intended to illustrate every instruction, method object or sub step that would be needed to program every aspect of a working program, but are provided at the high, functional level of illustration that is normally used at the high level of skill in this art to communicate the basis of developing working programs.

At step 602, a first synchronization operation is performed for a blockchain node of a plurality of blockchain nodes of a blockchain network. The first synchronization operation comprises the blockchain node receiving blockchain history data from one or more blockchain nodes of the plurality of blockchain nodes of the blockchain network and storing the blockchain history data in one or more digital data repositories. The blockchain history data comprises a plurality of blocks that represent a history of blocks of the blockchain network. For example, node 106 performs a first synchronization operation, i.e. an initial synchronization operation, by requesting and receiving one or more blocks from each of blockchain node 104, blockchain node 112, and blockchain node 110, collectively referred to as blockchain history data. The blockchain history data in then stored in one or more digital data repositories, such as database 214 from FIG. 2.

At step 604, is it determined that the blockchain history data satisfies one or more validation criteria. The one or more validation criteria may include: determining that the blockchain history data is executable, i.e. that blockchain history data is able to be executed by a blockchain node and not-corrupted, that the blockchain history data is updatable, i.e. that the blockchain history data is able to be updated by a blockchain node, and/or determining that the blockchain history data is stored in a predetermined format. For example, a service executing on server computer 208 may perform checking the blockchain history data against the validation criteria. The same service may also create metadata and set state flags or markers in associated with the stored blockchain history data, as discussed below.

In some embodiments, if it is determined that the blockchain history data satisfies the one or more validation criteria, a state of the blockchain history data is set to valid. If it is determined that the blockchain history data does not satisfy the one or more validation criteria, a state of the blockchain history data is set to invalid. Such states may be set by indicating a state of the blockchain history data in metadata or a state flag or marker associated with the blockchain history data. A valid state indicates that the blockchain history data is able to be executed or run by a blockchain node. An invalid state indicates that the blockchain history data is not able to be executed or run by a blockchain node. In some embodiments, a blockchain node is configured to only retrieve the blockchain history data if the state of the blockchain history data is set to valid. In some embodiments, a blockchain node is configured to restrict the retrieval of blockchain history data if the state of the blockchain history data is set to invalid. In this scenario, a blockchain node will not retrieve the blockchain history data is the state is set to invalid.

At step 606, a new blockchain node of the blockchain network is created. The new blockchain node configured to retrieve the blockchain history data from the one or more digital data repositories and replicate the blockchain history data for the new blockchain node. Since new blocks are constantly being added to the blockchain network by one or more other blockchain nodes of the blockchain network, when the new blockchain node is deployed based on the replicated blockchain history data, the new blockchain node is in an unsynchronized state with respect to the blockchain network. Being in an unsynchronized indicates that the new blockchain node is not up to date with respect to the blockchain network. Being 'not up to date' is defined as the respective blockchain node missing one or more blocks of the blockchain maintained by the blockchain network. For example, server computer 208 may facilitate creation of the new blockchain node as discussed above with respect to the blockchain orchestration system of FIG. 2, such a blockchain node 108 from FIG. 1. Blockchain node 108 is configured to retrieve the blockchain history data from database 214 and replicate the blockchain history data for the blockchain node 108.

At step 608, a second synchronization operation is performed for the new blockchain node of the blockchain network. The second synchronization operation comprises the new blockchain node receiving blockchain update data from one or more blockchain nodes of the plurality of blockchain nodes of the blockchain network resulting in converting the new blockchain node to a synchronized state. Blockchain update data comprises one or more blocks of a blockchain maintained by the blockchain network that, when combined with the blockchain history data, convert the new blockchain node to a synchronized state. The synchronized state of the new blockchain node of the blockchain network indicates that the new blockchain node is up to date with respect to the blockchain network. Being 'up to date' is defined as the respective blockchain node including all blocks of the blockchain maintained by the blockchain network, including the latest block maintained by the blockchain network. For example, new blockchain node 108 performs a second synchronization operation by requesting and receiving one or more blocks from other blockchain nodes of the blockchain network to reach a synchronized state, referred to a blockchain update data. When all blocks that are currently maintained by the blockchain network are received and stored by the blockchain node, the new blockchain node is in a synchronized state with respect to the blockchain network.

In some embodiments, additional new blockchain nodes can be created and synchronized such as discussed with respect to steps 606-608. Thus, Instead of performing an initial synchronization for every new blockchain node that is added to a blockchain network, a single initial synchronization operation can be performed for a single blockchain node and the blockchain history data received from the initial synchronization operation can be replicated for each new blockchain node. The replicated blockchain history data can be used as starting point for updating each new blockchain node with blockchain update data to synchronized state. In an orchestrator system where new blockchain nodes are frequently being created, these techniques save substantial amounts of computing resources and network bandwidth by avoiding performing an initial synchronization operation for each newly created blockchain node.

Periodically storing the blockchain history data retrieved from an initial synchronization operation can also be useful in the event of crash or failure of a synchronized blockchain node. If a synchronized blockchain node crashes, fails, or is corrupted, instead of performing an initial synchronization operation to recreate the synchronized state of the blockchain node, techniques discussed herein such as using the blockchain history data as a starting point for synchronization of a blockchain node result is less downtown of a blockchain node than conventional systems.

Proof of Stake Consensus

A consensus algorithm is defined as a mechanism through which all participating blockchain nodes of a blockchain network interact with each other to achieve agreement on a single data value among blockchain nodes of the blockchain network. Consensus algorithms ensure that blockchain protocol rules are being followed and guarantee that all transactions occur in a trustless way.

A consensus algorithm used in blockchain networks is a proof-of-stake (PoS) consensus algorithm. At a high level, PoS consensus algorithms run a lottery to choose a blockchain node to update a blockchain and award blockchain nodes with larger amount of stake (e.g. cryptocurrency) a higher chance of being chosen to write new blocks to the blockchain.

In a PoS procedure, transactions are submitted to the blockchain network through a blockchain node. The PoS algorithm executing on the blockchain node then groups all of the submitted transactions into a pool. All of the blockchain nodes contending to become a validator blockchain node for the next block raise a stake. As referred to herein, a 'validator blockchain node' is a blockchain node that performs validation operations for a block. The stake is combined with other factors like 'coin-age' or 'randomized block selection' to select the validator blockchain node.

Once the validator blockchain node is selected for the next block, the validator blockchain node executes code that performs one or more PoS consensus operations. Such operations include receiving the submitted transactions and grouping the transactions into a proposed block. Additional PoS consensus operations performed by the validator blockchain node include the validator node signing the proposed block, or in some embodiments, transmitting the proposed block to a signing service to perform the signing of the block. Once the proposed block is signed, the validator blockchain node broadcasts the proposed block to other blockchain nodes of the blockchain network. The other blockchain blockchain nodes of the blockchain network perform a series of checks on the proposed block to verify the proposed block. If the block is successfully verified by the other blockchain blockchain nodes of the blockchain network, the validator blockchain node gets the stake back and a reward for committing the proposed block. If the block is not successfully verified by other blockchain nodes of the blockchain network, the validator blockchain node loses its stake and is marked as 'bad' by the algorithm.

Losing stake and being marked as 'bad' by a PoS algorithm is referred to as "slashing". Slashing can occur in a blockchain network for a variety of reasons. For example, if a validator blockchain node of a blockchain network is launched in two different locations, each instance of the validator blockchain node may attempt to sign the same proposed block. When verifying the proposed block, other blockchain nodes of the blockchain network can detect that the same block is being proposed twice, and as a result, slash the validator blockchain node. In another example, software being executed by a validator blockchain node that is programmed or configured to group transactions into proposed blocks and sign the proposed blocks may crash or encounter errors during execution. Even though such crashes or errors may be unintentional, crashes and bugs may trigger equivocation events in the blockchain network and cause the validator blockchain node to be slashed.

Double Signing Protection

To mitigate the slashing of validator blockchain nodes in a blockchain network, a protective client can be deployed on or in association with a validator blockchain node to prevent common actions that can cause a validator blockchain node to be slashed. In one implementation, the protective client can be configured to communicate with a server computer that keeps track of instances of validator blockchain nodes that are running in a blockchain network. The server computer is configured to store locks associated with blockchain nodes of the blockchain network and only allow a validator blockchain node to execute its validator software and signing software if certain conditions exist in the blockchain network. In another implementation, the protective client can be configured to store a log that includes records of requests to sign a proposed block and permit signing of the proposed block if a request to sign the proposed block has not already been received by the protective client.

Figure 4:
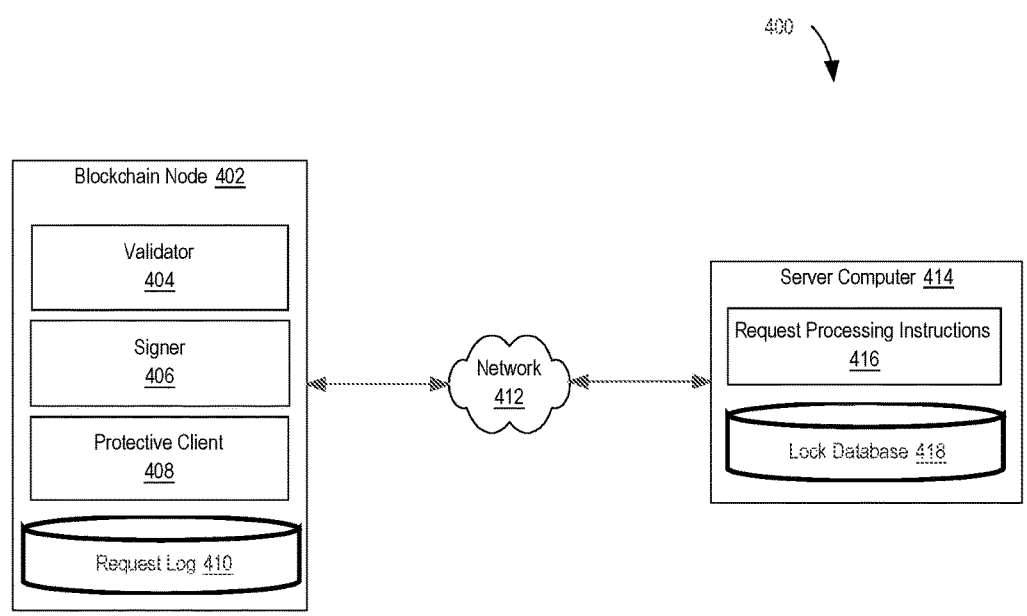
FIG. 4 illustrates an example networked computer system with which various double signing protection implementations may be practiced.

FIG. 4 illustrates an example networked computer system with which various double signing protection implementations may be practiced. FIG. 4 is shown in simplified, schematic format for purposes of illustrating a clear example and other implementations may include more, fewer, or different elements. System 400 comprises various entities and devices which may be used to practice an implementation. Network 412 is a network entity which facilitates communication between entities depicted in FIG. 4. Connection to network 412 is shown by double-sided arrows between a connecting entity and network 206. Network 412 may be any electronic communication medium or hub which facilitates communications between two or more entities, including but not limited to an internet, an intranet, a local area connection, a cloud-based connection, a wireless connection, a radio connection, a physical electronic bus, or any other medium over which digital and electronic information may be sent and received.

Blockchain node 402 comprises one or more computing devices. In some embodiments, blockchain node 402 comprises any blockchain node of blockchain network 102 from FIG. 1. In some embodiments, blockchain node 402 is configured to implement a PoS consensus algorithm and perform PoS consensus operations. In some embodiments, blockchain node 402 comprises a validator blockchain chain. Blockchain node 402 includes validator 404, signer 406, protective client 408 and request log 410, the functionality of which are discussed herein.

Validator 404 comprises computer executable instructions that may be programmed or configured to receive transactions and group one or more transactions into a proposed block. For example, validator 404 may be programmed or configured to receive transactions from external applications or one or more blockchain nodes of a blockchain network. Once transactions are received, validator 404 groups the transactions into a proposed block and transmits the proposed block to signer 406.

Signer 406 comprises computer executable instructions that may be programmed or configured to sign a proposed block and transmit the signed proposed block to one or more blockchain nodes of a blockchain network. For example, signer 406 may be programmed or configured to receive proposed blocks from validator 404 and digitally sign the proposed block using a private key associated with blockchain node 402. Once a proposed block is signed, signer 406 transmits the signed proposed block to one or more blockchain nodes of a blockchain network.

In some embodiments, validator 404 and signer 406 are configured to execute on the same blockchain node 402. In other embodiments, signer 406 may execute outside of blockchain node 402 such as on a different blockchain node or external computing device.

In some embodiments, signing a proposed block includes signer 406 hashing the proposed block and encrypting the hash of the proposed block with a private key that is paired with a public key. The encrypted hash of the proposed block is referred to as the digital signature of the proposed block. Once the digital signature of the proposed block is generated, the proposed block and digital signature are transmitted to one or more blockchain nodes that perform verification of the proposed block. To perform verification of the proposed block, a receiving blockchain node that receives the proposed block and the digital signature first decrypts the digital signature using the public key associated with the private key that was originally used to encrypt the proposed block, referred to herein as 'hash A'. Second, the receiving blockchain node uses the same hash function that was originally used to hash the proposed block by signer 406 to hash the received proposed block, referred to herein as 'hash B'. The receiving blockchain node then compares hash A is to hash B. If hash A matches hash B, it proves that the proposed block was not altered during transit and that the proposed block was generated by the signer 406.

Protective client 408 comprises computer executable instructions that may be programmed or configured to generate and transmit requests to server computer 414. Such requests may comprise requests to launch and/or execute one or more bodies of code including validator 404 and/or signer 406. Protective client 408 comprises computer executable instructions that may be programmed or configured to receive responses to requests and perform computer implemented actions based on the received responses. Such actions may include launching and executing one or more bodies of code including validator 404 and/or signer 406.

Request log 410 may be any number of individual or linked storage devices or mediums which allow the storage of digital data, as discussed herein. Request log 410 may further include one or more database management systems (DBMS) for accessing, retrieving, storing, and/or manipulating data stored in request log 410. In one embodiment, request log 410 stores records of requests to sign proposed blocks. For example, request log 410 stores records indicating one or more requests to sign a block within a specific blockchain protocol or network.

Server computer 414 is connected to network 412 and may be any hardware, software, virtual machine, or general-purpose entity capable of performing the processes discussed herein. In various implementations, the server computer 414 executes request processing instructions 416, the functions of which are described in other sections herein.

Request processing instructions 416 comprises computer executable instructions that may be programmed or configured to receive requests from blockchain node 402 and respond to such requests. For example, request processing instructions 416 may be programmed or configured to receive a request from blockchain node 402 comprising a global identification value of blockchain node 402. Once requests are received, request processing instructions 416 determines if the global identification value is locked by querying lock database 418. Request processing instructions 416 may then generate and transmit a response to the request that indicates whether the global identification value associated with blockchain node 402 is locked. Request processing instructions 416 may also modify digital data stored in lock database 418 to lock and unlock resources.

Lock database 418 may be any number of individual or linked storage devices or mediums which allow the storage of digital data, as discussed herein. Lock database 418 may further include one or more database management systems (DBMS) for accessing, retrieving, storing, and/or manipulating data stored in lock database 418. In one embodiment, lock database 418 stores digital data that indicates or keeps track of whether a compute resource, such as a body of code is locked. In some embodiments, the body of code comprises signer 406 and/or validator 404.

Blockchain Node Locking

As discussed above, protective client 408 can be configured to communicate with server computer 414 that keeps track of validator blockchain nodes that are running in a blockchain network. Server computer 414 is configured to store locks associated with blockchain nodes and only allow a validator blockchain node to execute its validator software and signing software if certain conditions exist in the blockchain network.

Figure 7:
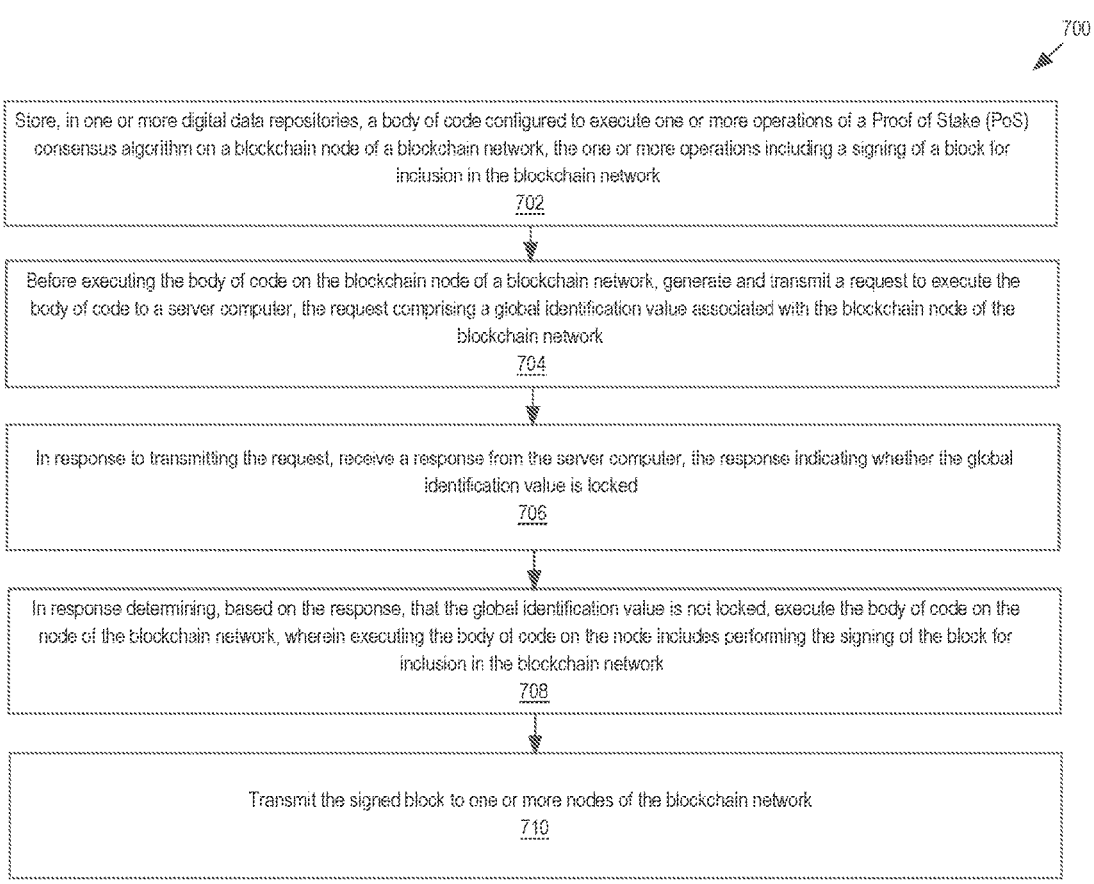
FIG. 7 depicts a method for identity specific blockchain node locking.

FIG. 7 depicts a method for identity specific blockchain node locking, in an example embodiment. FIG. 7 is described at the same level of detail that is ordinarily used, by persons of skill in the art to which this disclosure pertains, to communicate among themselves about algorithms, plans, or specifications for other programs in the same technical field. While the algorithm or method of FIG. 7 shows a plurality of steps, the algorithm or method described herein may be performed using programming. The flow diagrams are not intended to illustrate every instruction, method object or sub step that would be needed to program every aspect of a working program, but are provided at the high, functional level of illustration that is normally used at the high level of skill in this art to communicate the basis of developing working programs.

At step 702, a body of code configured to execute one or more operations of a Proof of Stake (PoS) consensus algorithm on a blockchain node of a blockchain network is stored in one or more digital data repositories. The one or more operations may include a signing of a block for inclusion in the blockchain network. In some embodiments, the one or more operations also include grouping one or more transactions into the block. For example, blockchain node 402 stores a body of code which includes at least one of validator 404 and signer 406. Both validator 404 and signer 406 comprise programming instructions that, when executed, perform one or more operations of a PoS consensus algorithm. For example, validator 404 is configured to receive one or more transactions from a client or blockchain node of the blockchain network and group one or more transactions into a proposed block. Signer 406 is configured to receive a proposed block from validator 404, sign the proposed block and transmit the signed proposed block to one or more blockchain nodes of a blockchain network.

At step 704, before executing the body of code on the blockchain node of a blockchain network, a request to execute the body of code is generated and transmitted to a server computer. The request comprises a global identification value associated with the blockchain node of the blockchain network. The global identification value uniquely identifies the blockchain node in the respective blockchain network. In some embodiments, the global identification value uniquely identifies the validator 404 and/or signer 406. In some embodiments, the request is encoded using an HMAC scheme. For example, protective client 408 executing on blockchain node 402 generates a request to execute the body of code. The request may be generated in response to protective client 408 attempting to launch validator 404 and/or signer 406. In another embodiment, the request may be generated in response to protective client 408 receiving a command or request to perform one or more operations of a PoS consensus algorithm. Once generated, blockchain node 402 transmits the request to sever computer 414.

At step 706, in response to transmitting the request, a response is received from the server computer, the response indicating whether the global identification value is locked. For example, once the request generated in step 704 is received by server computer 414, request processing instructions executing on server computer 414 queries lock database 418 to determine whether the global identification value included in the request is locked. If the result of the query indicates that the global identification value is locked, this scenario indicates that another blockchain node executing in blockchain network already has permission to execute the same body of code, which may include validator 404 and/or signer 406. If the result of the query indicates that the global identification value is not locked, this scenario indicates that another blockchain node executing in blockchain network does not currently have permission to execute the same body of code, which may include validator 404 and/or signer 406. In either event, server computer 414 transmits a response to the request to blockchain node 402 that indicate whether the global identification value is locked.

At step 708, in response determining, based on the response, that the global identification value is not locked, the body of code is executed on the node of the blockchain network. Executing the body of code on the node includes performing the signing of the block for inclusion in the blockchain network. For example, if the response received in step 706 indicates that the global identification value is not locked, protective client 408 launches and executes validator 404 and/or signer 406. If the response received in step 706 indicates that the global identification value is locked, protective client 408 restricts the launch and execution of validator 404 and/or signer 406, i.e. protective client 408 refuses to launch and execute or allow the launching and execution of validator 404 and/or signer 406 on blockchain node 402.

At step 710, the signed block is transmitted to one or more nodes of the blockchain network. For example, by executing validator 404 and/or signer 406 in step 708, one or more PoS consensus operations including at least one of: grouping one or more transactions into a proposed block and signing the proposed block are performed. Once signed, blockchain node 402 transmits the signed block to one or more blockchain nodes of the blockchain network.

Thus, by utilizing a central entity to keep track of which blockchain nodes are running and which software they are executing, the central entity can serve as a gatekeeper to running a blockchain node in a blockchain network. In an enterprise orchestrator environment where multiple blockchain nodes are being created and launched, these techniques help avoid launching the same blockchain node in two different locations, which can cause double signing of a block and lead to the respective blockchain node being slashed. These techniques conserve computing resources and network bandwidth by helping to avoid the double launching of an identical blockchain node which can lead to wasted computing resources and broadcasting of transactions and blocks in a blockchain network.

Protocol Aware Protection

As discussed above, protective client 408 can be configured to store a request log that includes a history of records of requests to sign proposed blocks. Protective client 408 may permit signing of a proposed block if a request to sign the proposed block has not already been received by protective client 408.

Figure 8:
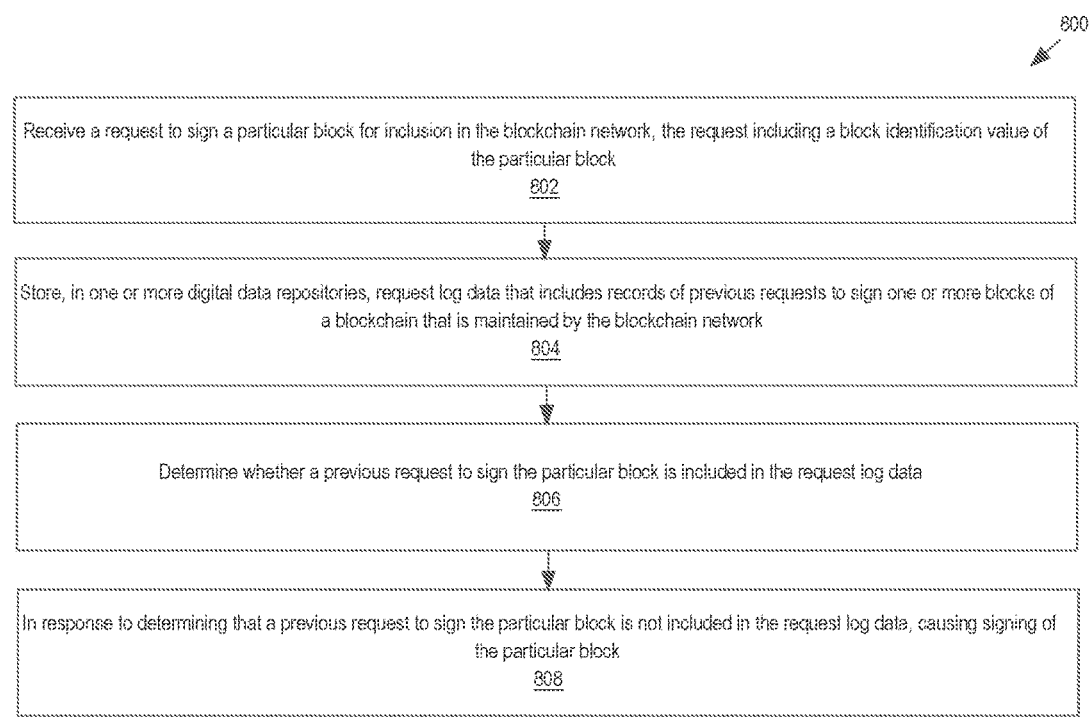
FIG. 8 depicts a method for providing a blockchain protocol aware protection interface.

FIG. 8 depicts a method for providing a blockchain protocol aware protection interface, in an example embodiment. FIG. 8 is described at the same level of detail that is ordinarily used, by persons of skill in the art to which this disclosure pertains, to communicate among themselves about algorithms, plans, or specifications for other programs in the same technical field. While the algorithm or method of FIG. 8 shows a plurality of steps, the algorithm or method described herein may be performed using programming. The flow diagrams are not intended to illustrate every instruction, method object or sub step that would be needed to program every aspect of a working program, but are provided at the high, functional level of illustration that is normally used at the high level of skill in this art to communicate the basis of developing working programs.

At step 802, a request to sign a particular block for inclusion in the blockchain network is received. The request includes a block identification value of the particular block. A block identification value uniquely identifies a block within a blockchain of a blockchain network or protocol. In some embodiments, a block identification value comprises a block height or block number. For example, validator 404 performs one or more operations of a Proof of Stake (PoS) consensus algorithm including receiving one or more transactions and grouping the one or more transactions into the particular block. Validator 404 transmits the particular block along with the block identification value for the particular block to protective client 408 as part of a request to sign the particular block.

At step 804, request log data that includes records of previous requests to sign one or more blocks of a blockchain that is maintained by the blockchain network is stored in one or more digital data repositories. For example, each time protective client 408 receives a request to sign a block, a record of the request in stored in the request log data. Each record may include a block identification value, e.g. 'block 1234' and an identification of a blockchain network or protocol associated with the block identification value, e.g. 'Ethereum' or 'Bitcoin'.

At step 806, it is determined whether a previous request to sign the particular block is included in the request log data. For example, protective client 408 compares the block identification value for the particular block to records included in the request log data to determine whether a record of a request to sign the particular block exists in the request log data.

At step 808, in response to determining that a previous request to sign the particular block is not included in the request log data, the particular block is caused to be signed. For example, protective client 408 determines that a record of a previous request to sign the particular block is not included in the request log data and in response, transmits the particular bock to signer 406. Signer 406 is configured to execute one or more block signing operations of a PoS consensus algorithm including signing the particular block and transmitting the signed particular block back to validator 404 or to one or more blockchain nodes of the blockchain network.

In some embodiments, in response to determining that a previous request to sign the particular block is included in the request log data, the request to sign the particular block is denied or restricted. For example, protective client 408 determines that a record of a previous request to sign the particular block is included in the request log data and in response, denies or restricts the request. In one embodiment, the request is denied and an error message is transmitted by protective client 408 to validator 404. In some embodiments, denying or restricting the request includes protective client 408 blocking the request from being transmitted to signer 406, transmitting a message to validator 404 that indicates that the request is invalid, and/or transmitting a command to validator 404 that halts operations of validator 404.

In some embodiments, validator 404 and signer 406 are each represented by separate bodies of code. In one embodiment, signer 406 executes on a separate computing device from validator 404 and is accessible by validator 404 over a network.

In some embodiments, the steps of flow 800 are executed in context of a PoS consensus algorithm to prevent slashing of the blockchain node that executes the PoS consensus operations.

Thus, by utilizing a central entity to keep track of requests issued by validators to signers, double signing of a proposed block can be prevented. In a scenario where multiple validators are using the same signing service to sign proposed blocks, the techniques discussed above become particularly important. These techniques ensure that only one block request is ever signed per block height. For example, if a signer receives a request to sign block 100 of the Ethereum blockchain protocol and signs the block, all further requests to sign block 100 are denied by the protective interface. These techniques conserve computing resources and network bandwidth by reducing the occurrence of double signing events at blockchain nodes that implement PoS consensus algorithms.

Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 9:
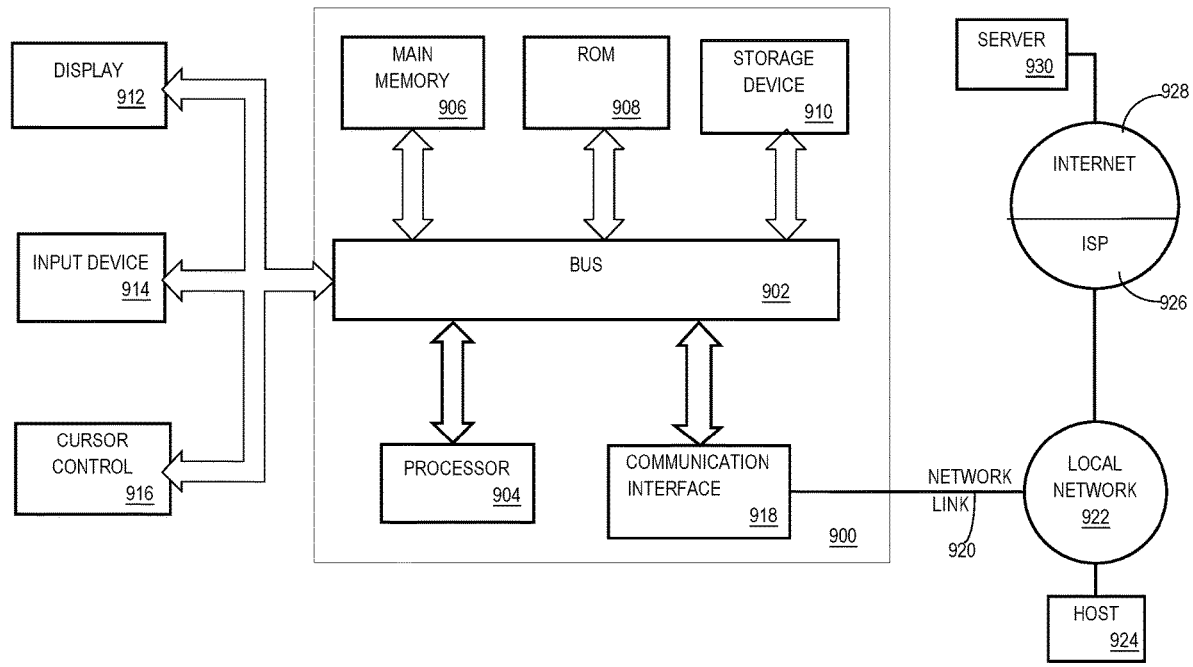
FIG. 9 depicts a computer system upon which an embodiment of the invention may be implemented.

FIG. 9 is a block diagram that illustrates an example computer system with which an embodiment may be implemented. In the example of FIG. 9, a computer system 900 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 900 includes an input/output (I/O) subsystem 902 which may include a bus and/or other communication mechanism(s) for communicating information and/or instructions between the components of the computer system 900 over electronic signal paths. The I/O subsystem 902 may include an I/O controller, a memory controller and at least one I/O port. The electronic signal paths are represented schematically in the drawings, for example as lines, unidirectional arrows, or bidirectional arrows.

At least one hardware processor 904 is coupled to I/O subsystem 902 for processing information and instructions. Hardware processor 904 may include, for example, a general-purpose microprocessor or microcontroller and/or a special-purpose microprocessor such as an embedded system or a graphics processing unit (GPU) or a digital signal processor or ARM processor. Processor 904 may comprise an integrated arithmetic logic unit (ALU) or may be coupled to a separate ALU.

Computer system 900 includes one or more units of memory 906, such as a main memory, which is coupled to I/O subsystem 902 for electronically digitally storing data and instructions to be executed by processor 904. Memory 906 may include volatile memory such as various forms of random-access memory (RAM) or other dynamic storage device. Memory 906 also may be used for storing temporary variables or other intermediate information during execution of instructions to be executed by processor 904. Such instructions, when stored in non-transitory computer-readable storage media accessible to processor 904, can render computer system 900 into a special-purpose machine that is customized to perform the operations specified in the instructions.

Computer system 900 further includes non-volatile memory such as read only memory (ROM) 908 or other static storage device coupled to I/O subsystem 902 for storing information and instructions for processor 904. The ROM 908 may include various forms of programmable ROM (PROM) such as erasable PROM (EPROM) or electrically erasable PROM (EEPROM). A unit of persistent storage 910 may include various forms of non-volatile RAM (NVRAM), such as FLASH memory, or solid-state storage, magnetic disk or optical disk such as CD-ROM or DVD-ROM, and may be coupled to I/O subsystem 902 for storing information and instructions. Storage 910 is an example of a non-transitory computer-readable medium that may be used to store instructions and data which when executed by the processor 904 cause performing computer-implemented methods to execute the techniques herein.

The instructions in memory 906, ROM 908 or storage 910 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 900 may be coupled via I/O subsystem 902 to at least one output device 912. In one embodiment, output device 912 is a digital computer display. Examples of a display that may be used in various embodiments include a touch screen display or a light-emitting diode (LED) display or a liquid crystal display (LCD) or an e-paper display. Computer system 900 may include other type(s) of output devices 912, alternatively or in addition to a display device. Examples of other output devices 912 include printers, ticket printers, plotters, projectors, sound cards or video cards, speakers, buzzers or piezoelectric devices or other audible devices, lamps or LED or LCD indicators, haptic devices, actuators or servos.

At least one input device 914 is coupled to I/O subsystem 902 for communicating signals, data, command selections or gestures to processor 904. Examples of input devices 914 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 916, which may perform cursor control or other automated control functions such as navigation in a graphical interface on a display screen, alternatively or in addition to input functions. Control device 916 may be a touchpad, a mouse, a trackball, or cursor direction keys for communicating direction information and command selections to processor 904 and for controlling cursor movement on display 912. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 914 may include a combination of multiple different input devices, such as a video camera and a depth sensor.

In another embodiment, computer system 900 may comprise an internet of things (IoT) device in which one or more of the output device 912, input device 914, and control device 916 are omitted. Or, in such an embodiment, the input device 914 may comprise one or more cameras, motion detectors, thermometers, microphones, seismic detectors, other sensors or detectors, measurement devices or encoders and the output device 912 may comprise a special-purpose display such as a single-line LED or LCD display, one or more indicators, a display panel, a meter, a valve, a solenoid, an actuator or a servo.

When computer system 900 is a mobile computing device, input device 914 may comprise a global positioning system (GPS) receiver coupled to a GPS module that is capable of triangulating to a plurality of GPS satellites, determining and generating geo-location or position data such as latitude-longitude values for a geophysical location of the computer system 900. Output device 912 may include hardware, software, firmware and interfaces for generating position reporting packets, notifications, pulse or heartbeat signals, or other recurring data transmissions that specify a position of the computer system 900, alone or in combination with other application-specific data, directed toward host 924 or server 930.

Computer system 900 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 900 in response to processor 904 executing at least one sequence of at least one instruction contained in main memory 906. Such instructions may be read into main memory 906 from another storage medium, such as storage 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 910. Volatile media includes dynamic memory, such as memory 906. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 902. Transmission media can also take the form of acoustic or light waves, such as those generated during radio-wave and infra-red data communications.

Various forms of media may be involved in carrying at least one sequence of at least one instruction to processor 904 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 900 can receive the data on the communication link and convert the data to a format that can be read by computer system 900. For instance, a receiver such as a radio frequency antenna or an infrared detector can receive the data carried in a wireless or optical signal and appropriate circuitry can provide the data to I/O subsystem 902 such as place the data on a bus. I/O subsystem 902 carries the data to memory 906, from which processor 904 retrieves and executes the instructions. The instructions received by memory 906 may optionally be stored on storage 910 either before or after execution by processor 904.

Computer system 900 also includes a communication interface 918 coupled to bus 902. Communication interface 918 provides a two-way data communication coupling to network link(s) 920 that are directly or indirectly connected to at least one communication networks, such as a network 922 or a public or private cloud on the Internet. For example, communication interface 918 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 922 broadly represents a local area network (LAN), wide-area network (WAN), campus network, internetwork or any combination thereof. Communication interface 918 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 918 sends and receives electrical, electromagnetic or optical signals over signal paths that carry digital data streams representing various types of information.

Network link 920 typically provides electrical, electromagnetic, or optical data communication directly or through at least one network to other data devices, using, for example, satellite, cellular, Wi-Fi, or BLUETOOTH technology. For example, network link 920 may provide a connection through a network 922 to a host computer 924.

Furthermore, network link 920 may provide a connection through network 922 or to other computing devices via internetworking devices and/or computers that are operated by an Internet Service Provider (ISP) 926. ISP 926 provides data communication services through a world-wide packet data communication network represented as internet 928. A server computer 930 may be coupled to internet 928. Server 930 broadly represents any computer, data center, virtual machine or virtual computing instance with or without a hypervisor, or computer executing a containerized program system such as DOCKER or KUBERNETES. Server 930 may represent an electronic digital service that is implemented using more than one computer or instance and that is accessed and used by transmitting web services requests, uniform resource locator (URL) strings with parameters in HTTP payloads, API calls, app services calls, or other service calls. Computer system 900 and server 930 may form elements of a distributed computing system that includes other computers, a processing cluster, server farm or other organization of computers that cooperate to perform tasks or execute applications or services. Server 930 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 930 may comprise a web application server that hosts a presentation layer, application layer and data storage layer such as a relational database system using structured query language (SQL) or no SQL, an object store, a graph database, a flat file system or other data storage.

Computer system 900 can send messages and receive data and instructions, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, and/or stored in storage 910, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening several instances of the same program often means more than one process is being executed. Multitasking may be implemented to allow multiple processes to share processor 904. While each processor 904 or core of the processor executes a single task at a time, computer system 900 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A computer-implemented method comprising:
performing a first synchronization operation for a blockchain node of a plurality of blockchain nodes of a blockchain network, the first synchronization operation comprising the blockchain node retrieving blockchain history data from one or more blockchain nodes of the plurality of blockchain nodes of the blockchain network and storing the blockchain history data in one or more off-chain databases;
in response to creating a new blockchain node of the blockchain network subsequent to the storage of the blockchain history data and determining that the blockchain history data satisfies one or more validation; criteria, retrieving the blockchain history data from the one or more off-chain databases and replicating the blockchain history data for the new blockchain node, in lieu of retrieving the blockchain history data from one or more blockchain nodes for replication for the new blockchain node; and
updating the new blockchain node with blockchain update data by retrieving the blockchain update data from one or more blockchain nodes of the plurality of blockchain nodes of the blockchain network, wherein the updating of the new blockchain node converts the new blockchain node to a synchronized state from an unsynchronized state of the new blockchain node that existed subsequent to the replication of the blockchain history data for the new blockchain node.

2. The method of claim 1, wherein the blockchain history data comprises a plurality of blocks that represent a history of blocks of the blockchain network.

3. The method of claim 1, wherein the one or more validation criteria comprises at least one of:
determining that the blockchain history data is executable and non-corrupt;
determining that the blockchain history data is updatable by a blockchain node; or
determining that the blockchain history data is stored in a predetermined format.

4. The method of claim 1, further comprising:
in response to determining that the blockchain history data satisfies the one or more validation criteria, setting a state of the blockchain history data to valid,
wherein the new blockchain node of the blockchain network is configured to restrict the retrieval of the blockchain history data from one or more blockchain nodes in response to determining that the state of the blockchain history data is set to valid.

5. The method of claim 1, wherein the unsynchronized state of the new blockchain node of the blockchain network indicates that the new blockchain node is not up to date with respect to the blockchain network.

6. The method of claim 1, wherein the blockchain update data comprises one or more blocks of a blockchain maintained by the blockchain network that, when combined with the blockchain history data, convert the new blockchain node to the synchronized state.

7. The method of claim 1, wherein the synchronized state of the new blockchain node of the blockchain network indicates that the new blockchain node is up to date with respect to the blockchain network.

8. The method of claim 1, further comprising:
creating an additional blockchain node of the blockchain network, the additional blockchain node configured to retrieve the blockchain history data from the one or more off-chain databases and replicate the blockchain history data for the additional blockchain node; and
performing a second synchronization operation for the additional blockchain node of the blockchain network, the second synchronization operation comprising the additional blockchain node receiving blockchain update data from one or more blockchain nodes of the plurality of blockchain nodes of the blockchain network resulting in converting the additional blockchain node to the synchronized state.

9. A computer system comprising:
one or more processors; and
one or more memories storing instructions which, when executed by the one or more processors, cause operations comprising:
performing a first synchronization operation for a blockchain node of a plurality of blockchain nodes of a blockchain network, the first synchronization operation comprising the blockchain node retrieving blockchain history data from one or more blockchain nodes of the plurality of blockchain nodes of the blockchain network and storing the blockchain history data in one or more off-chain databases;
in response to creating a new blockchain node of the blockchain network subsequent to the storage of the blockchain history data and determining that the blockchain history data satisfies one or more validation; criteria, retrieving the blockchain history data from the one or more off-chain databases and replicating the blockchain history data for the new blockchain node, in lieu of retrieving the blockchain history data from one or more blockchain nodes for replication for the new blockchain node; and
updating the new blockchain node with blockchain update data by retrieving the blockchain update data from one or more blockchain nodes of the plurality of blockchain nodes of the blockchain network, wherein the updating of the new blockchain node converts the new blockchain node to a synchronized state from an unsynchronized state of the new blockchain node that existed subsequent to the replication of the blockchain history data for the new blockchain node.

10. The system of claim 9, wherein the blockchain history data comprises a plurality of blocks that represent a history of blocks of the blockchain network.

11. The system of claim 9, wherein the one or more validation criteria comprises at least one of:
determining that the blockchain history data is executable and non-corrupt;
determining that the blockchain history data is updatable by a blockchain node; or
determining that the blockchain history data is stored in a predetermined format.

12. The system of claim 9, the instructions, when executed by the one or more processors, cause operations comprising:
in response to determining that the blockchain history data satisfies one or more validation criteria, setting a state of the blockchain history data to valid,
wherein the new blockchain node of the blockchain network is configured to restrict the retrieval of the blockchain history data from one or more blockchain nodes in response to determining that the state of the blockchain history data is set to valid.

13. The system of claim 9, wherein the unsynchronized state of the new blockchain node of the blockchain network indicates that the new blockchain node is not up to date with respect to the blockchain network.

14. The system of claim 9, wherein the blockchain update data comprises one or more blocks of a blockchain maintained by the blockchain network that, when combined with the blockchain history data, convert the new blockchain node to the synchronized state.

15. The system of claim 9, wherein the synchronized state of the new blockchain node of the blockchain network indicates that the new blockchain node is up to date with respect to the blockchain network.

16. The system of claim 9, the instructions, when executed by the one or more processors, cause operations comprising:
creating an additional blockchain node of the blockchain network, the additional blockchain node configured to retrieve the blockchain history data from the one or more off-chain databases and replicate the blockchain history data for the additional blockchain node; and
performing a second synchronization operation for the additional blockchain node of the blockchain network, the second synchronization operation comprising the additional blockchain node receiving blockchain update data from one or more blockchain nodes of the plurality of blockchain nodes of the blockchain network resulting in converting the additional blockchain node to the synchronized state.

17. A non-transitory, computer-readable medium comprising instructions recorded thereon that, when executed by one or more processors, causes operations comprising:
performing a first synchronization operation for a blockchain node of a plurality of blockchain nodes of a blockchain network, the first synchronization operation comprising the blockchain node retrieving blockchain history data from one or more blockchain nodes of the plurality of blockchain nodes of the blockchain network and storing the blockchain history data in one or more off-chain databases;
in response to determining that the blockchain history data satisfies one or more validation criteria, retrieving the blockchain history data from the one or more off-chain databases and replicating the blockchain history data for a new blockchain node of the blockchain network, in lieu of retrieving the blockchain history data from one or more blockchain nodes for replication for the new blockchain node; and
updating the new blockchain node with blockchain update data by retrieving the blockchain update data from one or more blockchain nodes of the plurality of blockchain nodes of the blockchain network, wherein the updating of the new blockchain node converts the new blockchain node to a synchronized state from an unsynchronized state of the new blockchain node that existed subsequent to the replication of the blockchain history data for the new blockchain node.

18. The non-transitory, computer-readable medium of claim 17, wherein the blockchain history data comprises a plurality of blocks that represent a history of blocks of the blockchain network.

19. The non-transitory, computer-readable medium of claim 17, the operations further comprising:

in response to determining that the blockchain history data satisfies the one or more validation criteria, setting a state of the blockchain history data to valid, wherein the new blockchain node of the blockchain network is configured to restrict the retrieval of the blockchain history data from one or more blockchain nodes in response to determining that the state of the blockchain history data is set to valid.

20. The non-transitory, computer-readable medium of claim 17, the operations further comprising:

creating a new blockchain node of the blockchain network subsequent to the storage of the blockchain history data; and in response to the creation of the new blockchain node and the determination that the blockchain history data satisfies the one or more validation criteria, retrieving the blockchain history data from the one or more off-chain databases and replicating the blockchain history data for the new blockchain node.

* * * * *